United States Patent

Lee et al.

[11] Patent Number: 5,525,082
[45] Date of Patent: Jun. 11, 1996

[54] TRANSOM TRAVEL SUPPORT FOR DEEP VEE HULLS

[76] Inventors: Steve G. Lee, 15951 Formby Dr., La Mirada, Calif. 90638; Darryl N. Hieda, 4845 Marlatt St., Mira Loma, Calif. 91752

[21] Appl. No.: 503,154

[22] Filed: Jul. 17, 1995

[51] Int. Cl.⁶ ..................................... B63H 5/12
[52] U.S. Cl. ..................... 440/53; 280/414.1; 248/642
[58] Field of Search .................... 114/343, 270; 440/53, 113; 280/414.1; 248/640, 642

[56] References Cited

U.S. PATENT DOCUMENTS

| | | | |
|---|---|---|---|
| 3,990,660 | 11/1976 | Pipoz | 248/4 |
| 4,828,186 | 5/1989 | Weiss | 248/640 |
| 4,842,239 | 6/1989 | Kinsey et al. | 248/640 |
| 4,950,189 | 8/1990 | Tahara et al. | 440/61 |
| 5,041,032 | 8/1991 | Makihara et al. | 440/53 |
| 5,293,835 | 3/1994 | Potter, Jr. | 114/364 |

*Primary Examiner*—Jesus D. Sotelo
*Attorney, Agent, or Firm*—David L. Baker; Rhodes & Ascolillo

[57] ABSTRACT

A trailer for transporting boats including a hitch, a frame including a pair of parallel side rails, a cradle and an axle with wheels, the improvement comprising a rear cross member with arms that will rotate about a bolt in the frame and drop down for unloading or loading a boat. In the raised position a support arm is attached to the cross member and may be elevated to engage the final drive area of an outboard motor in a yoke fixed to the end of the support arm.

7 Claims, 2 Drawing Sheets

TRANSOM TRAVEL SUPPORT FOR DEEP VEE HULLS

BACKGROUND OF THE INVENTION

1. Field of the Invention

This invention relates generally to the field of recreational boating and in particular to a device for supporting motors attached to the transom of a boat having a deep Vee hull and carried by a trailer during transit.

2. The Problem and Related Prior Art

Recreational boating is popular seasonal sport and additional enjoyment is derived by the ability to transport the boat from one location to another and taking advantage of the wide range of opportunities that exist. Currently, boats ranging from small to fairly large size are towed to the water each weekend and towed some relatively long distances. The trailers utilized for the purposes of carrying the boats are generally designed for the hull to be transported. For example, a flat bottom boat trailer has different characteristics than a trailer designed to carry a Vee bottom boat and in particular a deep Vee bottom boat.

Some trailers designed for transporting boats are of the tilt design, that is they load and unload by tilting the frame in order to allow the hull to slide on and off easier. Whether or not a trailer tilts it would be a disadvantage in design to construct a tailor for a deep Vee hull that included a rear cross member. The reason being that the hull would sit too high on the frame in order to clear the member when loading and unloading. The higher the hull sits in the frame the more unstable it is and the more wind resistance it encounters traveling on the road. As a result, the trailer constructed for deep Vee hulls lacks a rear cross support member. Without a cross member there is no way that a brace could be attached to support the engine mounted on the transom of the boat. Experience reveals that boats transported on trailers without some type of engine support will, after a period of time, cause cracks to develop in the transom and eventual failure of the structure.

The problem has been recognized and attempts made to provide a solution, however the solution proposed in this disclosure and appended claims is a significant improvement over the prior art as disclosed in the following U.S. Pats.: U.S. Pat. No. 3,990,660 issued Nov. 9, 1976 to Pipoz for a boat auxiliary motor support; U.S. Pat. No. 4,950,189 issued Aug. 21, 1990 to Tahara et al. for an arrangement for supporting the outboard motor of a boat; U.S. Pat. No. 5,041,032 issued Aug. 20, 1991 to Makihara et al. for a stern bracket for supporting the outboard motor of a boat, and U.S. Pat. No. 5,293,832 issued Mar. 15, 1994 to Potter, Jr. for an outboard motor mounting system. U.S. Pats. of particular relevance include U.S. Pat. No. 4,828,186 issued May 9, 1989 to Weiss for a motor support and U.S. Pat. No. 4,842,239 issued Jun. 27, 1989 to Kinsey et al. for an outboard motor support device. The devices are both straight, adjustable in length and attach between the lower motor assembly and the rear cross frame member of the trailer. The distinction between the two appears in the method of connection to the motor assembly and the cross member. These devices fail to anticipate the device disclosed and claimed herein.

SUMMARY OF THE INVENTION

The invention is characterized by a boat trailer for transporting deep Vee hulls and including a rear frame cross member. The member is hinged to and extends beyond the existing frame and provides an attachment point for an adjustable motor support. The cross member swings down and away from the trailer frame when the boat is loaded or unloaded and into position for travel. The motor support extends directly away from the cross member and curves in a direction that will cause it to engage outboard motor near the final drive thereby providing support where the motor is most inclined to move and cause damage and wear on the transom of the boat. The motor support includes a telescoping feature that allows the motor support to adapt to a variety of motors and final drives.

It is therefore an object of the invention to provide a new and improved travel transom support for boat trailers.

It is another object of the invention to provide a new and improved travel transom support for boat trailers that will support the outboard motor on a deep Vee hull boat.

It is a further object of the invention to provide a new and improved travel transom support for boat trailers that increases safety in transporting a boat.

It is still another object of the invention to provide a new and improved travel transom support for boat trailers that will prevent damage caused by forces created on the transom during transport.

It is still a further object of the invention to provide a new and improved travel transom support for boat trailers which is of a durable and reliable construction.

It is another object of the invention to provide a new and improved travel transom support for boat trailers which may be easily and efficiently manufactured and marketed.

These, together with other objects of the invention, are pointed out with particularity in the claims annexed to and forming a part of this disclosure. For a better understanding of the invention, its operating advantages and the specific object attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF A PREFERRED EMBODIMENT

Figure 1:
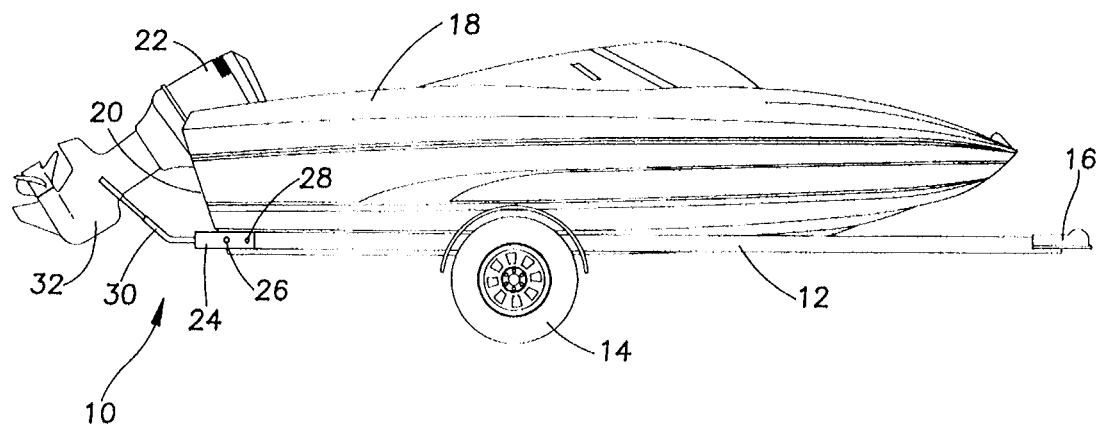
FIG. 1 is an environmental view of the invention with the support in position for travel.
Figure 2:
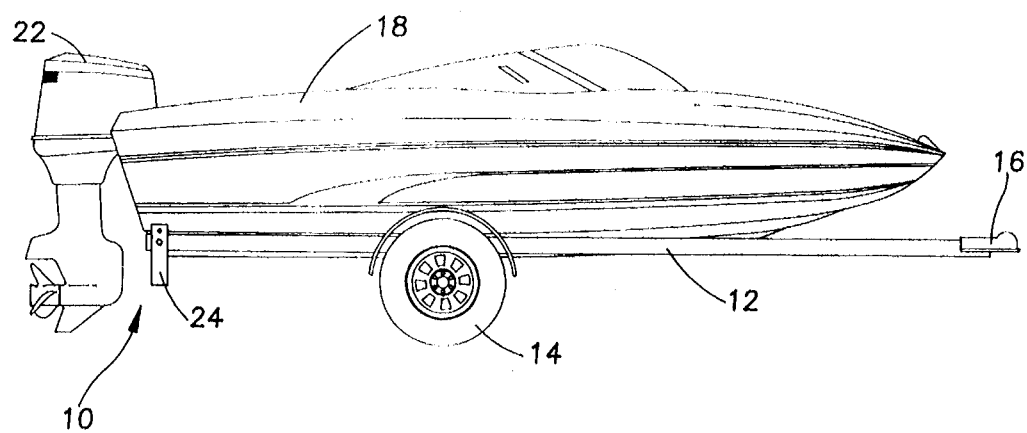
FIG. 2 is an environmental view of the invention in position for loading or unloading.

Referring now to FIGS. 1 and 2, the invention is shown generally at 10. The typical trailer consists of a frame 12 supported on wheels 14 and a hitch 16 for connecting the trailer to a tow vehicle. The boat 18 rests in a cradle not shown but located between the parallel frame rails 12. Attached to the transom 20 of the boat 18 is the outboard motor 22. The motor is supported only by the transom which in many cases is constructed of a fiberglass material and will eventually crack from the stress of the forces caused by the motor while the boat is being transported. A frame cross member is connected to the frame rails 12 by arms 24 which are hinged by a bolt 26 connected through the frame rail. A pin 28 is removably inserted through the arm and side rail to maintain the arm in the travel position as shown in FIG. 1. The motor support 30 is removably attached to the cross member and contains a yoke which engages the final drive area 32 of the motor 22. FIG. 2 shows the position of the cross member during on loading and off loading. The cross member is at the same level as the axle of the trailer so as not to interfere with the movement of the trailer on the loading ramp. With the pins 28 removed and the motor support 30 removed, the boat is free to roll on or off the cradle without obstruction.

Figure 3:
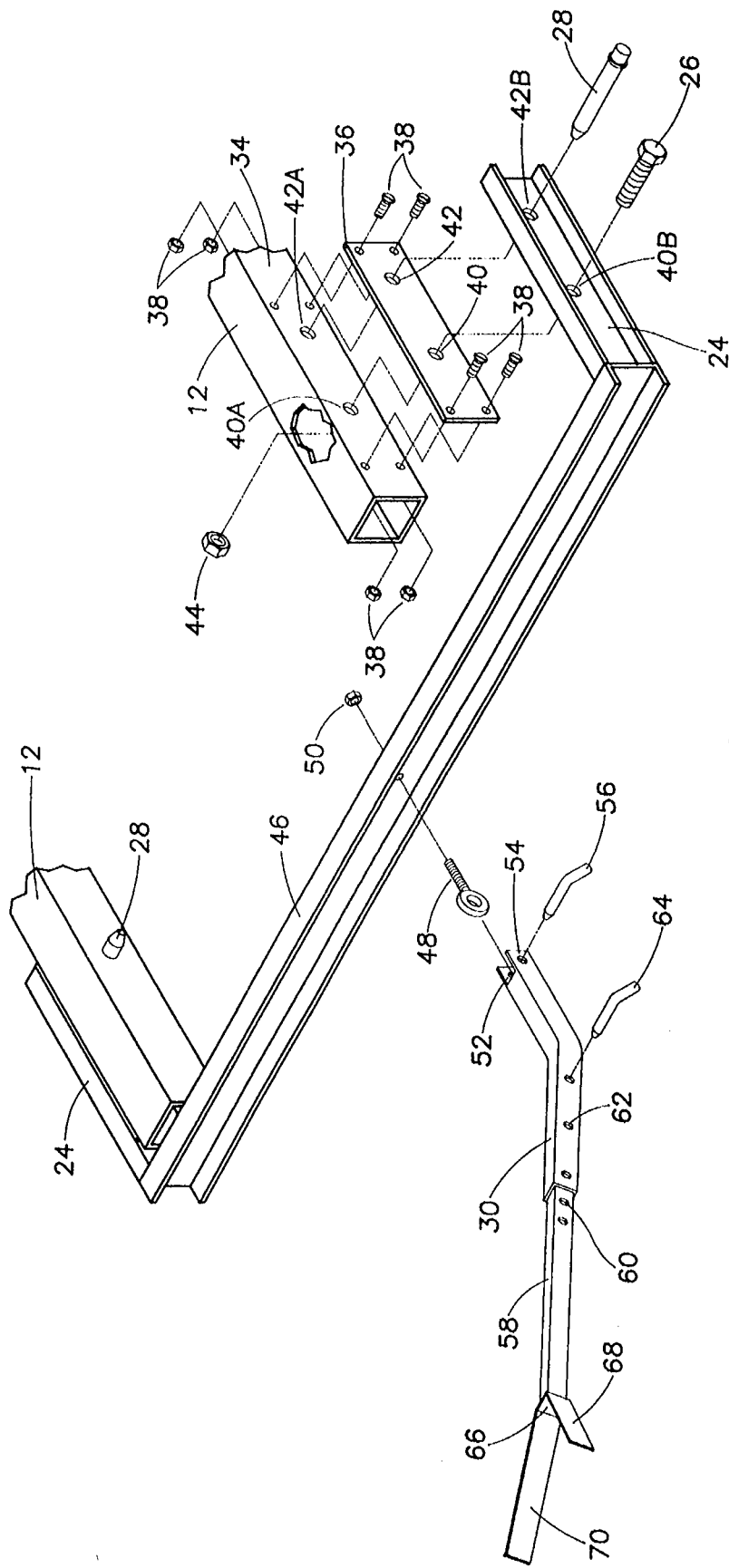
FIG. 3 is a perspective view of the invention exploded in part.

Concerning FIG. 3, the trailing ends of the trailer frame rails are shown at 12. Abutting the outside wall 34 of the frame 12 is a reinforcing plate 36 which is attached to the wall by suitable fasteners such as threaded nuts and bolts 38. Apertures 40 and 42 in the reinforcing plate align with the apertures 40A and 42A in wall 34 and 40B and 42B in the arm 24. The apertures 40 accept the hinge bolt 26 which threads into nut 44 within the structure of the frame 12. Apertures 42 accept the retaining pin 28 which secure arms 24, on each end of the cross member 46, in the travel position as seen in FIG. 1. Removal of pin 28 allows the cross member to swing down as shown in FIG. 2.

A threaded eye bolt 48 is affixed through the cross member and secured by nut 50. A bifurcation 52 at the end of support rod 30 allows engagement with the eye bolt and some degree of motion along the longitudinal axis. Aligning apertures 54 allow pin 56 to removably connect the support arm 30 to the eye bolt 48. A telescoping section 58 of arm 30 allows for adjustment in length of the arm which is made through compatible apertures 60,62 and pin 64. The distal terminus 66 of the support arm 30 contains a yoke with arms 68 and 70 to capture the outboard motor in the area of the final drive.

In use, the out board motor could be raise with the electronic trim control and lowered into the yoke. Further securing means could include the use of resilient cord attached to the hull to prevent bouncing of the engine in the support rod.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A support for elevating outboard motors on trailers having a pair of parallel side rails, an axle and a cradle for transporting deep Vee hull boats comprising:

a cross member positioned transverse to the longitudinal axis of the trailer, at the trailing ends of the side rails;

a pair of arms affixed to the cross member parallel to, and outboard of, the side rails;

means for connecting the arms to the rails whereby the cross member will move in an arc around the means for connecting;

pin means for securing the cross member from moving;

eye bolt means affixed to the cross member and extending to the rear of the trailer;

support rod means connected to the eye bolt means at one end, and yoke means formed on the opposed end of the support rod for receiving an outboard motor in the area of the final drive.

2. A support for elevating outboard motors on trailers according to claim 1 wherein: the cross member in its arc of movement drops no lower than the axle of the trailer.

3. A support for elevating outboard motors on trailers according to claim 2 wherein: the support rod is bifurcated on one end and contains aligned apertures for receiving a pin that will engage the eye bolt and secure the rod to the cross member.

4. A support for elevating outboard motors on trailers according to claim 3 wherein: the support rod is telescopically adjustable.

5. A support for elevating outboard motors on trailers according to claim 4 wherein: the support arm includes one portion inclined at an angle to another portion.

6. A support for elevating outboard motors on trailers according to claim 5 wherein: the means for connecting each arm to the trailer side rail is a threaded bolt.

7. A support for elevating outboard motors on trailers according to claim 6 further including a reinforcing plate affixed to the outboard wall of the trailer frame proximate said arms.

* * * * *